United States Patent Office

Re. 28,047
Reissued June 18, 1974

28,047

PROCESS FOR PREPARING COLORLESS, HIGH-VINYL DIENE POLYMERS

Thomas C. Bouton, Akron, and Shingo Futamura, Seville, Ohio, assignors to The Firestone Tire & Rubber Company, Akron, Ohio No Drawing. Original No. 3,686,158, dated Aug. 22, 1972, Ser. No. 71,413, Sept. 11, 1970. Application for reissue Aug. 15, 1973, Ser. No. 388,538
Int. Cl. C08d *3/04, 3/08, 3/12*
U.S. Cl. 260—94.2 M 6 Claims

Matter enclosed in heavy brackets [ ] appears in the original patent but forms no part of this reissue specification; matter printed in italics indicates the additions made by reissue.

ABSTRACT OF THE DISCLOSURE

In the polymerization of liquid diene monomer catalyzed by a lithium alkyl to produce a high-vinyl butadiene polymer, dimethyl ether is used to serve as a polar catalyst modifier for high-vinyl production and also as the auto-refrigerant to remove the heat of polymerization. While dimethyl ether is generally not regarded as a suitable polar component for this purpose, it is found to be ideally suited as the polar component under the conditions described herein and also particularly effective in controlling the polymerization temperature under the pressure and temperature conditions found to be suitable, namely no more than 100° F. (38° C.), advantageously no more than 80° F. (27° C.), preferably about 40° F. (5° C.), and pressures of about 25, 65, and 90 p.s.i.g. respectively for those corresponding temperatures.

BACKGROUND OF THE INVENTION

Field of the invention

It has been known that the proportion of 1,2- or vinyl type of repeating units in diene polymers produced by alkyl lithium-initiated polymerizations are increased by the presence of polar modifiers such as diethyl ether, tetrahydrofuran, dioxane, the diethyl ether of ethylene glycol, etc. Temperature is a limiting factor and it is generally desirable to conduct polymerizations below 0° F. (−18° C.) in order to obtain a maximum vinyl content and also to avoid color formation.

Prior art

U.S. Pat. 3,192,279 shows the polymerization of diolefins with vinyl aromatic hydrocarbons catalyzed with alkali metals in the presence of an open chain ether of 4 to 8 carbon atoms or the cyclic diethers of 4 to 8 carbon atoms. Apparently, dimethyl ether was not considered satisfactory for this purpose.

U.S. Pat. No. 3,306,949 discloses a process for the alkali metal polymerization of diolefins to give a high percent of 1,2- or vinyl type of butadiene repeating units using an ether modifier or diluent such as tetrahydrofuran, dioxane and the like, but in order to avoid the formation of color in the products, it is necessary to main a temperature below 0° F. (−18° C.). Higher temperatures give colored polymer products.

U.S. Pat. 3,288,872 discloses a process using ether modifiers such as dioxane for the alkali metal polymerization of dienes in the presence of hexamethyl phosphoramide at a temperature between 40 and 95° C. with a second polymerization conducted as high as 105° C. It is specifically stated, "Dimethyl ether also does not serve the desired purpose, both as regards reaction rate and product quality."

SUMMARY OF THE INVENTION

It has surprisingly been found in accordance with this invention that the production of high-vinyl content polymer and uniform temperature control can be effected with the avoidance of color formation by conducting the alkyl lithium-initiated, or other alkali metal catalyzed polymerization of dienes in dimethyl ether with the pressure controlled to give the dimethyl ether a boiling point of no more than 100° F. (38° C.), advantageously no more than 80° F. (27° C.) and preferably approximately 40° F. (5° C.). In addition to its function as solvent, the dimethyl ether also serves simultaneously as both the polar modifier to give a high proportion of vinyl or 1,2- structure in the repeating units and also to effect uniform temperature control by removal of the heat of polymerization through vaporization and condensation of the dimethyl ether and return of the cooled condensate to the polymerization mass.

DESCRIPTION OF THE INVENTION

The use of dimethyl ether as both a modifier and as an auto-refrigerant allows rapid polymerization due to improved heat removal with more absolute control of the resulting microstructure of the polymer. Local overheating is avoided by instantaneous removal of heat of reaction by vaporization of the modifier wherever there might otherwise be local overheating. Improved control allows greater productivity per unit reactor volume. Temperature is controlled below 100° F. (38° C.), advantageously below 80° F. (27° C.) and preferably about 40° F. (5° C.), and the avoidance of the local overheating which occurs in the conventional jacket cooling processes results in more precise control of the microstructure. Dimethyl ether and may be used as the sole solvent, or a mixture of dimethyl ether and another solvent may be used, the other solvent being of the type generally used in diene polymerizations, preferably one which will not interfere with or complicate the vaporization-condensation control system of this invention, such as hexane, pentane, butane, propane, benzene, toluene, THF, diethyl ether, methyl ethyl ether, trimethylamine, triethylamine, tripropylamine and the like.

In accordance with the present invention, it has been found that, whereas it is necessary with ethers having higher boiling points, that is having 4 or more carbon atoms, that the polymerization must be carried out at lees than 0° F. (−18° C.) in order to avoid producing colored products, it is now possible to use dimethyl ether, which was previously regarded as unsatisfactory as a polar modifier, as both modifier and auto-refrigerant with the added advantage that the polymerization can be carried out at higher temperatures even up to 100° F. (38° C.), but advantageously no higher than 80° F. (27° C.) while still obtaining water white products. As previously indicated, this process has the added advantage of 10–100 times increased productivity per unit reactor volume, and much better control of the microstructure, especially in a larger reactor, due to the prevention of local overheating.

Any of the conjugated dienes, preferably those having no more than 8 carbon atoms, can be advantageously employed in the practice of this invention. Typical of these are 1,3-butadiene, isoprene, piperylene, 2,3-dimethyl-1,3-butadiene and the like. Mono-olefinic monomers may be used in copolymerization with the dienes up to 60% of the combined weight of diene and comonomers.

The comonomers are preferably vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethylstyrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, vinyl diphenyl, vinyl diphenylmethane, isopropenyl diphenyl, isopropenyl diphenylmethane, vinyl diphenylethane, 4-vinyl-4'-methyl diphenyl, 4-vinyl 4'-chloro diphenyl, and the like. Where such comonomers are to be used, generally at least 1%, preferably at least 5% by weight should be used and as much as 60% may be used.

As initiators it is preferred to use lithium alkyls, such as n-butyl lithium and other alkyl lithiums having up to 12 carbon atoms, but also suitable for this purpose are the alkali metals such as Na, K and Li, and their alkyl and aryl compounds preferably having no more than 12 carbon atoms. Typical of such initiators are n-butyl sodium, n-amyl potassium, secondary octyl lithium, n-propyl lithium, n-decyl sodium, tertiary nonyl potassium, sodium naphthalene, lithium diphenyl, lithium benzyl, lithium diphenylmethane, potassium naphthalene and the like.

The proportion of catalyst depends on the molecular weight desired in the catalyst. Advantageously 0.1–100 millimoles of catalyst is used per 100 grams of monomer.

While the maximum and preferred temperatures are as indicated above, the minimum reaction temperature is determined according to what is a practical polymerization rate. While the microstructure improves with lowering of the temperature, temperatures below 0° F. are less practical because of the cost of refrigeration equipment and its operating expense. Actually the microstructures obtained in the temperature range of about 40–80° F. (5–27° C.) are satisfactory and the reaction rates are very practical, so this temperature range is preferred.

Generally about 30 weight percent by weight of dimethyl ether based on the weight of monomer is advantageously used. Higher concentrations of DME allow faster rates of feed since heat removal can be effected faster and as much as 200 percent or higher may be used. However the throughput or production rate of the equipment is reduced accordingly. For catalyst modified and temperature control or heat removal purposes, there should be at least 10 percent of DME. The amount of solvent used also depends somewhat on the viscosity of the polymer to be produced. Other solvents can be used with the DME, if desired, but in such cases there should be at least the above-mentioned 10% DME. Other solvents that may be used include pentane, hexane, benzene toluene, tetrahydrofuran, lower ethers and lower trialkyl amines, and other solvents generally suitable for alkali metal polymerization of dienes.

Various means of practicing the invention are illustrated by the following examples. These examples are intended merely to illustrate the invention and not in a sense to limit the manner in which the invention can be practiced. The parts and percentages recited therein and all through the separation, unless specifically provided otherwise, are by weight.

The dilute solution viscosity (DSV) reported in the examples is defined as the inherent viscosity determined at 25° C. on a 0.4% solution of the polymer in toluene. This is calculated by dividing the natural logarithm of the relative viscosity by the percent concentration of the solution, i.e., it is the inherent viscosity measured at 0.4% concentration.

EXAMPLE I

Into a 500 gallon reactor equipped with condensor, turbine agitator and a control means for returning condensate to the reactor or removing it from the system, there are added 210 lbs. of dimethyl ether, 10.7 lbs. of a hexane solution containing 15% n-butyl lithium (1.6 lbs. nBuLi). The temperature inside the reactor is lowered by vaporizing dimethyl ether, condensing it in the condensor, and returning it cooled to the reactor. Then 1,3-butadiene is metered in at an average rate of 65 lbs. per hour while at the same time the heat of polymerization is removed by vaporizing, condensing and returning cooled dimethyl ether to the reactor so as to keep the temperature during polymerization below 50° F. When 500 lbs. of butadiene has been added, the butadiene feed is terminated. Reaction is continued for an additional hour and then 2.2 lbs. of isopropanol is added to deactivate the butyl lithium catalyst. The reaction mixture is gradually heated to 120° F., allowing the dimethyl ether to escape from the system, and the temperature of the reaction mass is kept at 120° F. for five hours in order to strip off the dimethyl ether. The polymer product is water white and has a dilute solution viscosity (DSV) of 0.30. The vinyl content is about 90 percent. In comparison with the process described below in Example II, which is used commerically in making high-vinyl polybutadiene by the conventional tetrahydrofuran processes, a much greater average production rate is attained, namely 65 lbs. per hour for 70% total solids for the auto-refrigeration process vs. 22 pounds per hour for 60% total solids by the conventional process. Moreover, this auto-refrigeration product is much lighter in color than the product obtained by the conventional process.

EXAMPLE II

A conventional commercial polymerization is used in a 500 gallon turbine agitated reactor for comparative purposes. The butadiene monomer is metered into the reactor containing as solvent a mixture of tetrahydrofuran and hexane, and as catalyst n-butyl lithium. The rate of monomer addition is controlled by a pneumatic control valve which responds to the batch temperature. At the completion of the polymerization, the catalyst is deactivated by the addition of alcohol, and the product stabilized with 0.10 part per hundred of dibutylparacresol and 0.01 part per hundred of bis-N,N'-(1-ethyl-3-methylphenyl-p-phenylene diamine. For one batch run the conditions and results are summarized below, determined at an intermediate stage when 1200 lbs. of butadiene had been charged and at the end when the total of 1670 lbs. had been charged.

| Weight of monomer charged (lbs.) | Percent total solids | Polymerization rate (lbs./hr.) | Temperature, ° F. | |
|---|---|---|---|---|
| | | | Batch | Coolant |
| 1,200 | 40 | 34 | 36 | −11 |
| 1,670 | 60 | 10 | 40 | −11 |

NOTE.—The total polymerization time is 76 hours.

EXAMPLE III

The auto-refrigeration procedure of Example I is repeated in 13 runs. The polymerizations are run in a 500 gallon anchor agitated reactor using a 32 ft.$^2$ heat exchanger for condensing dimethyl ether. A 10-ton refrigeration system is used which corresponds to a heat generation rate of 200 lbs. of butadiene per hour. Monomer feed rates are varied from 50 to 116 lbs. per hour. The dimethyl ether is first treated with n-butyl lithium to remove any catalyst poisons and this material is distilled to the polymerization vessel. Then n-butyl lithium is charged to the reaction vessel and the addition of butadiene initiated. The rate of monomer addition is controlled to maintain the maximum vapor temperature around 40–50° F. with a resulting polymer vinyl content of 95%. When the desired dilute solution viscosity is achieved, the batch is transferred to a 500 gallon, turbine agitated stripping vessel. Approximately 55 to 70% of the dimethyl ether is recovered from low molecular weight polymers, that is below 0.30 DSV, by heating to 200° F. These polymers are capable of being agitated at high polymer concentrations, that is about 95% total solids, while stripping off the ether. Higher viscosity polymers, about 0.9 DSV, are too viscous during the stripping operation and have to be diluted with hexane. Residual dimethyl ether levels in the polymers range from 2.3 to 8.4% depending on polymer molecular weight.

After the maximum amount of dimethyl ether has been removed, each batch is diluted with hexane transferred to a storage tank or 55 gallon drum, the catalyst deactivated with isopropanol and stabilized with 0.1 part per hundred DBC and 0.01 part per hundred Eastazone 31. The polymers produced by this dimethyl ether autorefrigeration process are much lighter in color, from colorless to yellowish, compared with the yellowish to dark brown polymers prepared in the conventional process of Example II. The least color is obtained when the termination is effected with isopropanol in the absence of air followed by stabilization. Less satisfactory terminators include water, methanol and antioxidant. The most dense precipitate forms when water is used as precipitator.

EXAMPLE IV

The procedure of Example I is repeated maintaining the temperature at 35–40° F. (2–5° C.) until there is 80 percent conversion to polymer. Then return of the vaporized dimethylether is stopped and the temperature in the reactor allowed to rise to 120° F. In this way most of the dimethylether is removed by the heat of polymerization, thereby avoiding the need for subsequent removal of dimethylether. This saves the time and heat required for this step. The resultant cement contains 12% dimethylether in contrast to the 30% present during the initial polymerization. There is little color change and little decrease in vinyl content, which is still over 90%. This can be repeated with satisfactory results for stopping return of dimethylether upon reaching conversions of 60–90%.

EXAMPLE V

The procedure of Example I is repeated a number of times using isoprene, a 50–50 mixture of isoprene and butadiene, and piperylene respectively as the diene. In each case a high vinyl polymer is obtained, and the production rate is considerably greater than when a mixture of tetrahydrofuran and hexane is used as the solvent instead of dimethyl ether.

EXAMPLE VI

The procedure of Example I is repeated a number of times using n-butyl sodium, n-amyl potassium, lithium metal, sodium naphthalene and sodium metal respectively as the catalyst. In each case a satisfactory polymer is obtained, and the production rate is considerably greater than when a mixture of tetrahydrofuran and hexane is used as the solvent instead of dimethyl ether.

The time required for reaction will vary according to a number of factors such as temperature, catalyst concentration, the particular diene being used, degree of conversion desired, and the like. In any case it is found that with the uniform temperature and reaction conditions maintained by the presence of the dimethyl ether as described herein, it is possible, for a particular set of conditions, to conduct a polymerization at a much faster production rate than with systems previously used.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. In the solution polymerization to produce a polymer of improved color of a conjugated diene initiated by an alkali metal hydrocarbon catalyst, the improvement whereby dimethylether is present in the polymerization mass in the multipurpose function of solvent, catalyst modifier and temperature control agent in a proportion of at least 10 parts by weight per 100 parts by weight of polymerizable monomer, the temperature being maintained above 0° F. and no higher than [100° F.] *120° F.* primarily by vaporizing dimethylether, condensing and cooling the same and returning the cooled condensate to the polymerization reactor, the vaporization and return of condensate being conducted at a rate sufficient to maintain the temperature below [100° F.] *120° F.*

2. The polymerization process of claim 1 in which said temperature is maintained no higher than [80° F.] *100° F.*

3. The polymerization process of claim 1 in which said temperature is maintained is in the range of 40–80° F.

4. The polymerization process of claim 1 in which 30–100 parts by weight of dimethylether is present per 100 parts by weight of said monomer.

5. The polymerization process of claim 1 in which said temperature is about 40° F.

6. The process of claim 5 in which about 30 parts by weight of said dimethylether is present per 100 parts by weight of said monomer.

References Cited

The following references, cited by the Examiner, are of record in the patented file of this patent or the original patent.

UNITED STATES PATENTS

| | | | |
|---|---|---|---|
| 3,110,706 | 11/1965 | Vollment et al. | 260—93.5 |
| 3,301,840 | 1/1967 | Zelinski | 260—94.2 M |
| 3,306,949 | 2/1967 | Mertzweiller et al. | 260—680 |
| 3,382,224 | 5/1968 | Wood | 260—94.2 M |
| 3,686,158 | 8/1972 | Bouton et al. | 260—94.2 M |

JOSEPH L. SCHOFER, Primary Examiner

W. F. HAMROCK, Assistant Examiner

U.S. Cl. X.R.

260—83.7; 85.3

PO-1050
(5/69)

UNITED STATES PATENT OFFICE
CERTIFICATE OF CORRECTION

Patent No. Reissue 28,047 Dated June 18, 1974

Inventor(s) Thomas C. Bouton and Shingo Futamura

It is certified that error appears in the above-identified patent and that said Letters Patent are hereby corrected as shown below:

In Column 1, Line 61, "main" should be --maintain--.

In Column 2, Line 34, delete "and".

In Column 2, Line 47, "lees" should be --less--.

Signed and sealed this 26th day of November 1974.

(SEAL)
Attest:

McCOY M. GIBSON JR.
Attesting Officer

C. MARSHALL DANN
Commissioner of Patents